(12) United States Patent
Kim et al.

(10) Patent No.: US 9,456,414 B2
(45) Date of Patent: Sep. 27, 2016

(54) COMMUNICATION METHOD OF A TERMINAL AND AN ACCESS POINT FOR MULTI-USER TRANSMISSION OPPORTUNITY (TXOP) POWER SAVING

(71) Applicant: Samsung Electronics Co., Ltd., Suwon-si (KR)

(72) Inventors: Young Soo Kim, Seoul (KR); Ui Kun Kwon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/618,601

(22) Filed: Feb. 10, 2015

(65) Prior Publication Data

US 2015/0156720 A1    Jun. 4, 2015

Related U.S. Application Data

(63) Continuation of application No. 14/183,814, filed on Feb. 19, 2014, now Pat. No. 9,155,043, which is a continuation of application No. 13/211,398, filed on Aug. 17, 2011, now Pat. No. 8,681,675.

(60) Provisional application No. 61/412,489, filed on Nov. 11, 2010, provisional application No. 61/417,528, filed on Nov. 29, 2010.

(30) Foreign Application Priority Data

Aug. 17, 2010   (IN) .......................... 2361/CHE/2010
Mar. 14, 2011   (KR) ........................ 10-2011-0022324

(51) Int. Cl.
*G08C 17/00* (2006.01)
*H04W 52/02* (2009.01)
(Continued)

(52) U.S. Cl.
CPC ..... *H04W 52/0216* (2013.01); *H04W 52/0219* (2013.01); *H04W 52/0229* (2013.01); *H04W 52/0235* (2013.01); *H04W 72/1257* (2013.01); *H04W 88/08* (2013.01); *Y02B 60/50* (2013.01)

(58) Field of Classification Search
CPC .................... H04W 52/0216; H04W 52/0235
See application file for complete search history.

(56) References Cited

U.S. PATENT DOCUMENTS 7,974,250 B2    7/2011  Jang et al.
8,630,272 B2 *  1/2014  Park .................. H04W 72/1215
                                                    370/328
(Continued)

FOREIGN PATENT DOCUMENTS

CN     101584229 A      11/2009
JP     2009-523372 A     6/2009
(Continued)

OTHER PUBLICATIONS

IEEE 802.11-10/876r0, 802.11ac preamble, Jul. 13, 2010.*
(Continued)

*Primary Examiner* — Maharishi Khirodhar
(74) *Attorney, Agent, or Firm* — NSIP Law (57) ABSTRACT

Provided is a terminal and an access point in an active mode for multi-user transmission opportunity (TXOP) power saving that may decrease power consumption by changing an operation state of the terminal from an awake state to a sleep state if there is no stream of data to be transmitted during a TXOP duration.

35 Claims, 6 Drawing Sheets

(51) Int. Cl.
H04W 88/08 (2009.01)
H04W 72/12 (2009.01)

(56) References Cited

U.S. PATENT DOCUMENTS

| | | | |
|---|---|---|---|
| 8,681,675 B2 | 3/2014 | Kim et al. | |
| 2005/0018624 A1 | 1/2005 | Meier et al. | |
| 2006/0062181 A1 | 3/2006 | Chou | |
| 2006/0252443 A1 | 11/2006 | Sammour et al. | |
| 2007/0037548 A1 | 2/2007 | Sammour et al. | |
| 2007/0058605 A1* | 3/2007 | Meylan et al. | 370/346 |
| 2007/0191052 A1 | 8/2007 | Kneckt et al. | |
| 2007/0286222 A1 | 12/2007 | Balasubramanian | |
| 2008/0095091 A1 | 4/2008 | Surineni et al. | |
| 2009/0122768 A1 | 5/2009 | Nakashima et al. | |
| 2009/0310692 A1* | 12/2009 | Kafle et al. | H04L 5/0007 375/260 |
| 2010/0029325 A1 | 2/2010 | Wang et al. | |
| 2010/0177712 A1* | 7/2010 | Kneckt | H04W 76/023 370/329 |
| 2011/0096797 A1 | 4/2011 | Zhang et al. | |

FOREIGN PATENT DOCUMENTS

| | | |
|---|---|---|
| JP | 2009-528745 A | 8/2009 |
| JP | 2012-500605 A | 1/2012 |
| KR | 10-2005-0003575 A | 1/2005 |
| KR | 10-2006-0131049 A | 12/2006 |
| KR | 10-2007-0116399 A | 12/2007 |
| KR | 10-2008-0014422 A | 2/2008 |
| WO | WO 2006/115999 A2 | 11/2006 |
| WO | WO 2007081683 A2 * | 7/2007 |
| WO | WO 2007/085948 A2 | 8/2007 |
| WO | WO 2008/149598 A1 | 12/2008 |
| WO | WO 2009/015170 A1 | 1/2009 |
| WO | WO 2010/022255 A1 | 2/2010 |

OTHER PUBLICATIONS

IEEE 802.11-09/0992r13, 802.11 wireless LAN. specification framework for TGac, Jul. 2010.*
IEEE (802.11-10/876r0, 802.11 ac Preamble, Jul. 13, 2010, entire document).*
Ravindra et al., Impact of Polling Strategy on Capacity of 802.11 Based Wireless Multimedia Lans, Department of Electrical and Electronics Engineering, University of Melbourne, Australia, Sep. 28-Oct. 1, 1999, entire document.
Zhu, C., et al., "TXOP Enhancement for DL MU-MIMO Support", IEEE 802.11 doc# 11-10/0591r0, May 2010 (8 pages).
Sampath, H., et al., "802.11ac Preamble." IEEE 802.11 doc # 11-10/876r0, Jul. 2010 (10 pages).
Stacey, R. et al., "Specification Framework for TGac", IEEE 802.11 doc# 11-09/0992r13, Jul. 2010 (21 pages).
International Search Report issued on Feb. 15, 2012 in counterpart International Application No. PCT/KR2011/005867 (3 pages, in English).
Extended European Search Report issued Apr. 7, 2014 in European Patent Office for Patent Application No. 11753605.2-1855 (11 pages).
Japanese Office Action issued Oct. 21, 2014 in counterpart Japanese Application No. JP 2013-524777. (3 pages, in Japanese, 2 pages, in English).
Chinese Office Action issued on Nov. 21, 2014, in counterpart Chinese Application No. 201180023355.7 (25 pages in English, 11 pages in Chinese).
Extended European Search Report issued by the European Patent Office on Feb. 17, 2015 for the corresponding patent application No. 14192820.0.
Extended European Search Report issued on May 29, 2015 in counterpart European Patent Application No. 14194347.2 (12 pages, in English).
Japanese Office Action issued on Jun. 16, 2015 in couterpart Japanese Application No. 2013-524777 (6 pages, in English).
Minho Cheong (ETRI) et al.: "phy adhoc report May; 11-10-0571-08-00ac-phy-adhoc-report-may", IEEE Draft; 11-10-0571-08-00AC-PHY-ADHOC-REPORT-MAY, IEEE-SA Mentor, Piscataway, NJ USA, vol. 802.11ac, No. 8, Aug. 7, 2010, pp. 1-188, XP017676947, [retrieved on Aug. 7, 2010] (188 pages, in English).
Samsung, et al., "DL MU TXOP Power Save", IEEE 802.11-10/1302r0, full text, Nov. 7, 2010.
Patil Sandhya (Samsung), "DL TXOP PS protocol", IEEE 802.11-11/0091r0, IEEE, Internet <URL: https://mentor.ieee.org/802.11/dcn/11/11-11-0091-00-00ac-dl-txop-ps-protocol.pptx >, Jan. 17, 2011.
Japanese Office Action issued on Jan. 12, 2016 in counterpart Japanese Application No. 2015-084017 (2 pages in English, 3 pages in Japanese).
Joonsuk Kim (Broadcom), "GroupID in VHT-SIG Field". IEEE 802.11-10/0582r1, IEEE, Internet <URL: https://mentor.ieee.org/802.11/dcn/10/11-10-0582-01-00ac-groupid-in-vht-sigfield. ppt>, May 2010.
Byeongwoo Kang (LG Electronics), "PHY Power Saving Features for 11ac", IEEE 802.11-10/0785r1, IEEE, Internet <URL: https://mentor.ieee.org/802.11/dcn/10/11-10-0785-01-00ac-phy-power-saving-features-for-11ac.ppt>, Jul. 2010.
Japanese Office Action issued on Mar. 8, 2016 in counterpart Japanese Patent Application No. 2013-524777. (4 pages in English; 4 pages in Japanese).
"Draft Amendment to IEEE Standard for Local and Metropolitan Area Networks Part 16: Air Interface for Broadband Wireless Access Systems; P80216Rev2_D9a", IEEE Draft; P80216REV2_D9A, IEEE-SA, Piscataway, NJ USA, vol. 802.16, Mar. 18, 2009, pp. 1-2098, XP017635117.
Shadi Abu-Surra: "PHY/MAC Complete Proposal Specification", IEEE 802.11-10/0433R2, May 18, 2010, pp. 45-53, XP055176773. (URL:https://mentor.ieee.org/802.11/dcn/10/11-10-0433-02-00ad-cp-specification.docx).
Extended European Search Report issued on May 10, 2016 in counterpart European Patent Application No. 16151347.8 (8 pages in English).

* cited by examiner

COMMUNICATION METHOD OF A TERMINAL AND AN ACCESS POINT FOR MULTI-USER TRANSMISSION OPPORTUNITY (TXOP) POWER SAVING

CROSS-REFERENCE TO RELATED APPLICATION(S)

This present application is a continuation of U.S. patent application Ser. No. 14/183,814 filed Feb. 19, 2014, which is a continuation of U.S. patent application Ser. No. 13/211,398 filed Aug. 17, 2011, now U.S. Pat. No. 8,681,675, issued Mar. 25, 2014, which claims the benefit under 35 U.S.C. §119(e) of U.S. Provisional Application No. 61/412,489, filed on Nov. 11, 2010, and U.S. Provisional Application No. 61/417,528, filed on Nov. 29, 2010, both of which were filed in the U.S. Patent and Trademark Office, and the benefit under 35 U.S.C. §119(a) of India Patent Application No. 2361/CHE/2010, filed Aug. 17, 2010, in the Intellectual Property Office of India, and Korean Patent Application No. 10-2011-0022324, filed on Mar. 14, 2011, in the Korean Intellectual Property Office, the entire disclosures of which are incorporated herein by reference for all purposes.

BACKGROUND

1. Field

The following description relates to a communication method of a terminal and an access point in an active mode for multi-user transmission opportunity (TXOP) power saving.

2. Description of Related Art

Mobile terminals such as smart phones allow a user to simultaneously perform a variety of functions. The functions include, for example, making a call, playing a motion picture, playing a music file, viewing a digital multimedia broadcasting (DMB), a digital camera function, Bluetooth, wireless Internet access, and the like, using a single device. These functions can consume a great deal of power.

In addition, as the data rate of mobile communication networks, Bluetooth, wireless Internet, and the like, increases, the power consumption of a terminal also increases. Accordingly, a need for a high capacity battery for a terminal also increases.

In general, the development of a battery capacity has increased at a slower pace in comparison to the development of the speed of communication technologies. As a result, it is becoming more difficult to satisfy the power consumption of the terminal by increasing the battery capacity alone. Accordingly, there is a desire for a communication method that may decrease the power consumption of a terminal.

SUMMARY

In one general aspect, there is provided a communication method of a terminal in a wireless network comprising an access point and a plurality of terminals, the method including generating a power saving mode indicator based on whether the terminal supports a power saving mode for a transmission opportunity (TXOP) duration, transmitting the power saving mode indicator to the access point, receiving, from the access point, information used to determine an operation state of the terminal in the power saving mode, and determining the operation state of the terminal in the power saving mode based on the information, wherein the TXOP duration corresponds to a time duration in which the access point obtaining a TXOP with respect to a channel simultaneously transmits data streams to a group of terminals.

The transmitting may comprise transmitting a frame comprising the power saving mode indicator while the terminal is performing association with the access point.

If the terminal supports the power saving mode, the power saving mode indicator may have a first logic value, and if the terminal does not support the power saving mode, the power saving mode indicator may have a second logic value.

The method may further comprise verifying a power saving mode indicator of the access point that is received from the access point, wherein the power saving mode indicator of the access point comprises information about whether the access point is capable of supporting the power saving mode with respect to the terminal.

The method may further comprise transmitting, to the access point, information indicating the operation state of the terminal.

The determining may comprise changing the operation state of the terminal based on information received from the access point, and based on whether the terminal supports the power saving mode.

The changing may comprise changing the operation state of the terminal to one of an awake state and a sleep state based on the information received from the access point.

The information received from the access point may comprise at least one of a group identifier (ID) of a group comprising the terminal, information indicating whether a data stream corresponding to the terminal is transmitted from the access point during the TXOP duration, and information indicating whether there is an additional data stream to be transmitted to the terminal during the remainder of the TXOP duration.

In another aspect, there is provided a communication method of an access point in a wireless network comprising the access point and a plurality of terminals, the method including receiving information indicating whether each of the terminals supports a power saving mode for a transmission opportunity (TXOP) duration, transmitting, to at least one terminal that supports the power saving mode from among the plurality of terminals, information used to determine an operation state of the at least one terminal, receiving information indicating the operation state of the at least one terminal that is determined by the at least one terminal based on the transmitted information, and simultaneously transmitting data streams to the terminals during the TXOP duration based on information indicating the operation state of the at least one terminal, wherein the TXOP duration corresponds to a time duration in which the access point obtaining a TXOP with respect to a channel simultaneously transmits data streams to a group comprising the at least one terminal.

The method may further comprise transmitting information about whether the access point is capable of supporting the power saving mode with respect to the terminals, or information about a support capability of the access point for the power saving mode.

The information about whether the access point is capable of supporting the power saving mode with respect to the terminals may be included in a power saving mode indicator of the access point and may be based on whether the access point is capable of supporting the power saving mode.

The receiving may comprise receiving, from each of the terminals, a frame comprising a power saving mode indicator indicating whether each of the respective terminals supports the power saving mode while each of the terminals is performing association with the access point.

The method may further comprise transmitting, to the terminals, a TXOP setting frame comprising information about the TXOP duration, wherein the TXOP setting frame comprises information about a service set or a cell in which the terminals are included and information about the group, and is generated such that it is capable of being decoded by both a terminal supporting the power saving mode and a terminal not supporting the power saving mode.

The simultaneously transmitting may comprise simultaneously transmitting the data streams to terminals that are in an awake state for the TXOP duration, or buffering a data stream to be transmitted to a terminal that is in a sleep state.

The information used to determine the operation state of the at least one terminal may comprise at least one of a group identifier (ID) of a group comprising the at least one terminal, information indicating whether a data stream corresponding to the at least one terminal is transmitted from the access point during the TXOP duration, and information indicating whether there is an additional data stream to be transmitted to the at least one terminal during the remainder of the TXOP.

In another aspect, there is provided a computer-readable storage medium comprising program instructions to cause a processor to implement a communication method of a terminal in a wireless network comprising an access point and a plurality of terminals, the method including generating a power saving mode indicator based on whether the terminal supports a power saving mode for a transmission opportunity (TXOP) duration, transmitting the power saving mode indicator to the access point, receiving, from the access point, information used to determine an operation state of the terminal in the power saving mode, and determining the operation state of the terminal in the power saving mode based on the information, wherein the TXOP duration corresponds to a time duration in which the access point obtaining a TXOP with respect to a channel simultaneously transmits data streams to a group of terminals.

In another aspect, there is provided a terminal that operates in an active power saving mode, the terminal including a receiver configured to receive a data frame from an access point (AP), the data frame comprising a group ID indicating whether the terminal is included in a group that is served by the AP, and a controller configured to control a power saving mode of the terminal based on whether the terminal is included in the group ID.

The data frame may further comprise an indicator that indicates whether the terminal is included in a group that is to receive data from the AP during a transmission opportunity (TXOP) obtained by the AP.

The indicator may comprise a number of state time space (NsTs) included in a very high throughput signal (VHT-SIG) field of the data frame.

The data frame may further comprise a more data bit (MDB) indicating whether transmission of data to the terminal is completed for the remainder of the TXOP duration. The MDB may be included in a media access control (MAC) header of the data frame.

In response to the data frame comprising an indicator indicating that the terminal is included in the group served by the AP, and the data frame comprising a NsTs field indicating that the terminal is to receive data during a TXOP obtained by the AP, the controller may be further configured to operate the terminal in an active state in which the terminal listens for a next data frame.

In response to the data frame comprising an indicator indicating that the terminal is included in the group served by the AP, the data frame comprising a NSTS field indicating that the terminal is to receive data during a TXOP obtained by the AP, and the data frame comprising a MDB bit indicating that the AP has no more data to be transmitted to the terminal during the TXOP, the controller may be further configured to operate the terminal in sleep state in which the terminal does not listen for a next data frame, after the terminal is finished receiving the data included in the frame.

The terminal may further comprise a transmitter configured to transmit, to the AP, a data frame comprising a power saving mode indicator that indicates whether the terminal is capable of operating in the power saving mode for a TXOP duration.

The power save mode indicator may be included in a capability/support field of an association request frame.

The receiver may be further configured to receive, from the AP, a beacon frame comprising an information element or a capability element that indicates whether the AP is capable of supporting power saving mode for a TXOP duration.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

In various examples, a terminal may correspond to a single-user multiple-input multiple-output (SU-MIMO) terminal or a multi-user MIMO (MU-MIMO) terminal.

Figure 1:
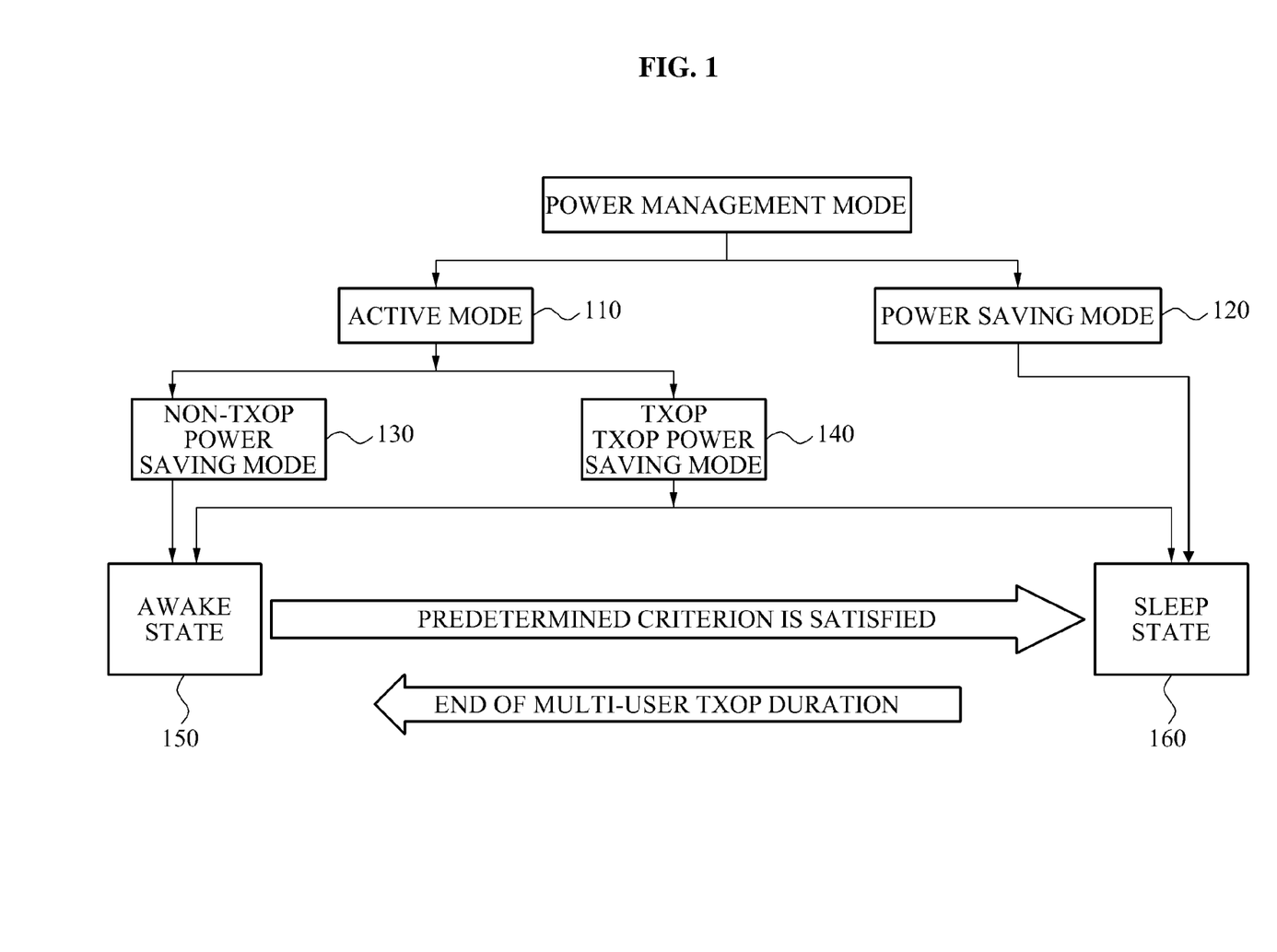
FIG. 1 is a diagram illustrating an example of an operation state and an operation of a terminal in a transmission opportunity (TXOP) power saving mode.

FIG. 1 illustrates an example of an operation state and an operation of a terminal in a transmission opportunity (TXOP) power saving mode.

A terminal that receives data from an access point may maintain a power management mode or an operation mode, as an active mode, in order to receive a packet or a frame transmitted to the terminal. Also, to determine whether there is a packet or a frame to be transmitted to the terminal, or to overhear a packet to be transmitted to another terminal, the terminal may operate in the active mode.

If there is no transmission of data corresponding to the terminal, or if the transmission of data to the terminal is terminated, it is possible to save power by adjusting the power management mode of the terminal.

Referring to FIG. 1, a power management mode of terminals includes an active mode 110 and a power saving mode 120.

In the active mode 110, a terminal may continuously operate to transmit and receive data to and from an access point. In the power saving mode 120, the terminal may enter into a state, for example, a sleep state 160 in which the terminals conserve power. To enter into the power saving mode 120, the terminal may transmit information about an operation state of the terminal to the access point using a one or more bits of a control field of a Media Access Control (MAC) header.

The terminals operating in the active mode 110 may be divided into terminals that operate in a non-TXOP power saving mode 130 and terminals that operate in a TXOP power saving mode 140.

A terminal operating in the non-TXOP power saving mode 130 may maintain an awake state 150 without a separate operation for the power saving. Accordingly, the terminal operating in the non-TXOP power saving mode 130 may continuously consume power during a receive standby time that is used to wait for receiving a packet that is transmitted to the terminal.

A terminal operating in the TXOP power saving mode 140 may change an operation state to the awake state 150 or to the sleep state 160 (also referred to as a doze state) based on whether a predetermined criterion is satisfied.

For example, the predetermined criterion for a terminal may include a plurality of criteria such as a first criterion, a second criterion, and a third criterion. In this example, the first criterion is satisfied for the terminal if a group identifier (ID) of a group indicates that the terminal is not a member of the group.

The second criterion is satisfied if the group ID of the group indicates that the terminal is a member of the group, however, a data stream corresponding to the terminal is not to be transmitted from the access point during a TXOP. In this example, to indicate that a data stream corresponding to the terminal is not to be transmitted from the access point during the TXOP, a number of state time space (NsTs) included in a very high throughput signal (VHT-SIG) field of a frame corresponding to the terminal may be set to a predetermined value, for example, a value of '0'.

The third criterion is satisfied if the terminal receives an indicator indicating that there are no more additional data streams corresponding to the terminal to be transmitted during the TXOP. For example, the group ID may indicate that the terminal is a member of the group, the NsTs may indicate that there is a frame to be transmitted to the terminal during the TXOP. The terminal may receive a data frame from the AP during the TXOP. The data frame may include an indicator that indicates that there is no more data to be transmitted to the terminal during the remainder of the TXOP. In this example, the access point may indicate to the terminal that the access point is finished transmitting data to the terminal during the TXOP.

As an example, the indicator indicating that there is no additional data stream corresponding to the terminal may correspond to a case in which a more data bit (MDB) included in a MAC header of a frame received by the terminal from the access point is set to '0'. For example, the MDB of the MAC header may be set to '0' to indicate that transmission of the data stream corresponding to the terminal is completed for that respective TXOP duration. As another example, the MDB of the MAC header may be set to '1' to indicate that there is an additional data stream to be transmitted to the terminal during the TXOP.

A terminal that has any one of the aforementioned criteria satisfied may save receive standby power for the remainder of the TXOP duration by changing an operation state from the awake state 150 to the sleep state 160. The TXOP duration indicates a time duration in which the access point transmits data streams to a group of terminals.

In this example, the terminal operating in the TXOP power saving mode 140 may save consumption power and receive standby power by changing the operation state to the awake state 150 or the sleep state 160 for the TXOP duration based on the predetermined criterion. Hereinafter, the TXOP power saving mode 140 may be referred to as a power saving mode.

Figure 2:
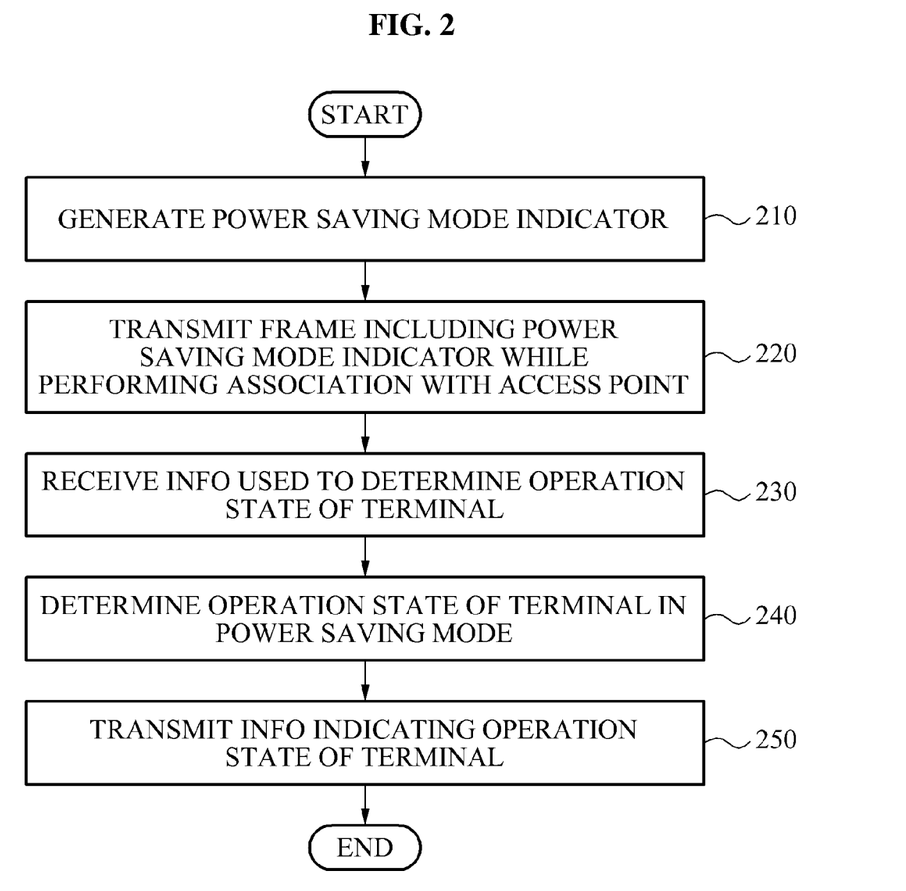
FIG. 2 is a flowchart illustrating an example of a communication method of a terminal.

FIG. 2 illustrates an example of a communication method of a terminal. The communication method of the terminal is described in an example of a wireless network including an access point and a plurality of terminals.

Referring to FIG. 2, in 210, the terminal generates a power saving mode indicator based on whether the terminal supports a power saving mode for a TXOP duration. The TXOP duration may correspond to a time duration in which the access point obtains a TXOP with respect to a channel to simultaneously transmit data streams to a group of terminals. While the terminal is performing association with the access point, the terminal may verify a power saving mode indicator of the access point, that is, a power saving mode indicator that is received from the access point.

In 220, the terminal transmits, to the access point, a frame including the power saving mode indicator. For example, the terminal may transmit the frame to the access point by including the power saving mode indicator in an information element of a capability/support field of an association request frame such as described by IEEE 802.11. In response to a valid acknowledgement (ACK) being received from the access point with respect to the frame including the power saving mode indicator, the terminal may operate based on a TXOP power saving mode.

In this example, if the terminal supports the power saving mode, the power saving mode indicator may have a first logic value, and if the terminal does not support the power saving mode, the power saving mode indicator may have a second log value. For example, the first logic value may be '1' and the second logic value may be '0'.

In 230, the terminal receives, from the access point, information that is used to determine an operation state of the terminal in the power saving mode.

In 240, the terminal determines the operation state of the terminal in the power saving mode based on information that is used to determine the operation state of the terminal in the power saving mode that is received in 230. The terminal may change the operation state of the terminal based on information received from the access point, for example, information used to determine the operation state of the terminal that is based on whether the terminal supports the power saving mode.

For example, the information received from the access point may include at least one of a group ID of a group including the terminal, information indicating whether a data stream corresponding to the terminal is transmitted from the access point during the TXOP, and information indicating whether there is an additional data stream to be transmitted to the corresponding to the terminal during the remainder of the TXOP.

The terminal may change the operation state of the terminal to one of an awake state and a sleep state based on information that is received from the access point. The terminal may change the operation state of the terminal based on whether a predetermined criterion is satisfied. An example of the predetermined criterion is described herein with reference to FIG. 1. In 250, the terminal transmits, to the access point, information indicating the operation state of the terminal.

Figure 3:
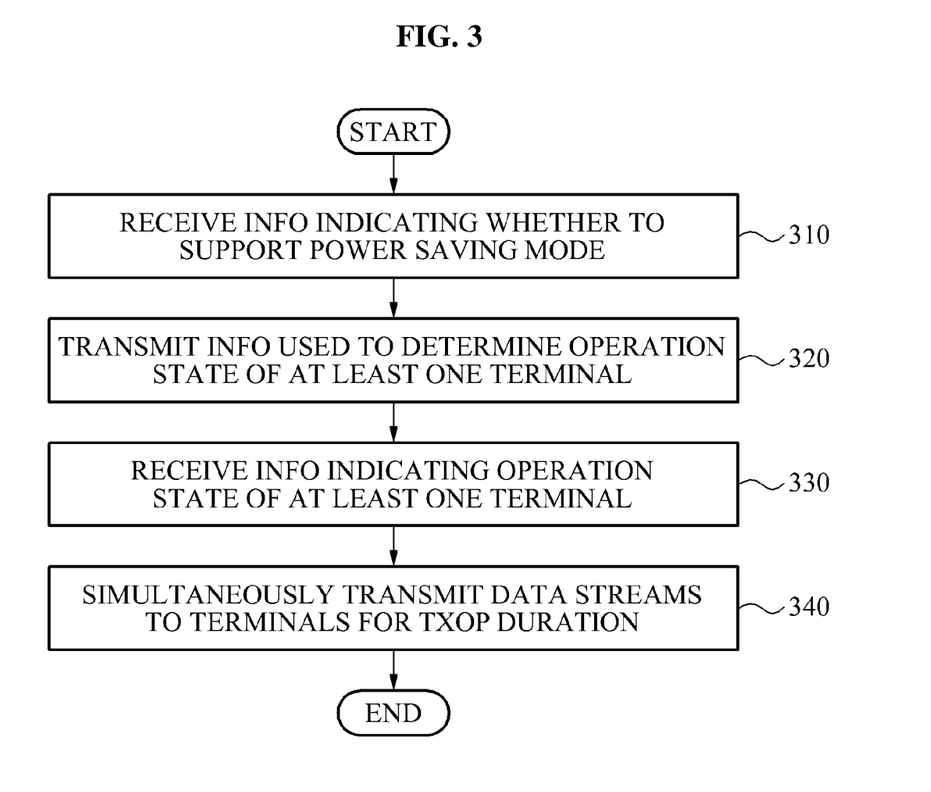
FIG. 3 is a flowchart illustrating an example of a communication method of an access point.

FIG. 3 illustrates an example of a communication method of an access point. The communication method of the access point is described in an example of a wireless network including the access point and a plurality of terminals.

The access point may generate a power saving mode indicator including information that indicates whether the access point supports the power saving mode, and may transmit the power saving mode indicator to the terminals. While performing association with the access point, each of the terminals may verify the power saving mode indicator of the access point. The access point may further transmit, to the terminals, information about a support capability of the access point for the power saving mode.

For example, to inform the terminals about whether the access point is capable of supporting the power saving mode and information about the support capability of the access point, the access point may use an information element or a capability element of a probe response frame or a beacon frame. As another example, the access point may use a TXOP power saving support bit to indicate whether the access point is capable of supporting the power saving mode.

In this example, the access point may generate the power saving mode indicator of the access point based on whether the access point is capable of supporting the power saving mode, and may transmit the power saving mode indicator of the access point to the terminals. The power saving mode indicator may express the TXOP power saving support bit indicating whether the access point is capable of supporting the power saving mode. The power saving mode indicator may use a predetermined logic value. Whether the access point is capable of supporting the power saving mode is used to indicate whether the access point is capable of performing association with the terminal that is operating in the power saving mode.

Referring to FIG. 1, in 310, the access point receives information indicating whether each of the terminals supports the power saving mode. The TXOP duration may correspond to a time duration in which the access point simultaneously transmits data streams to a group of terminals.

For example, the access point may transmit, to the terminals, a TXOP setting frame including information about the TXOP duration. The TXOP setting frame may include information about a service set or a cell in which the terminals are included and information about the group, and may be generated such that it is capable of being decoded by both a terminal that supports the power saving mode and a terminal that does not support the power saving mode. An example of the TXOP setting frame is described with reference to FIG. 4.

In 320, the access point transmits, to at least one terminal supporting the power saving mode from among the plurality of terminals, information that is used to determine an operation state of the at least one terminal. For example, the information that is used to determine the operation state may include at least one of a group ID of a group including the at least one terminal, information indicating whether a data stream corresponding to the at least one terminal is transmitted from the access point during the TXOP, and information indicating whether there is an additional data stream to be transmitted to the at least one terminal during the remainder of the TXOP.

In 330, the access point receives information indicating the operation state of the at least one terminal. The operation state may be determined by the at least one terminal based on information that is used to determine the operation state of the at least one terminal. After performing association with the terminal, the access point may receive information about a current operation state of the terminal and then determine an operation of the access point.

In 340, the access point simultaneously transmits data streams to the terminals for the TXOP duration. The access point may simultaneously transmit data streams based on information indicating the operation state of the at least one terminal. The access point may simultaneously transmit the data streams to terminals that are in an awake state for the TXOP duration, or may buffer a data stream to be transmitted to a terminal that is in a sleep state if the data stream to be transmitted to the terminal occurs while the terminal is in the sleep state for the remainder of the TXOP duration.

In some examples, the access point may simultaneously transmit data streams to a plurality of terminals that are included in the group of terminals that is to receive data during the TXOP. It should be appreciated that simultaneously transmitting does not necessarily mean that the data streams transmitted to the plurality of terminals start and/or stop at the same time.

Figure 4:
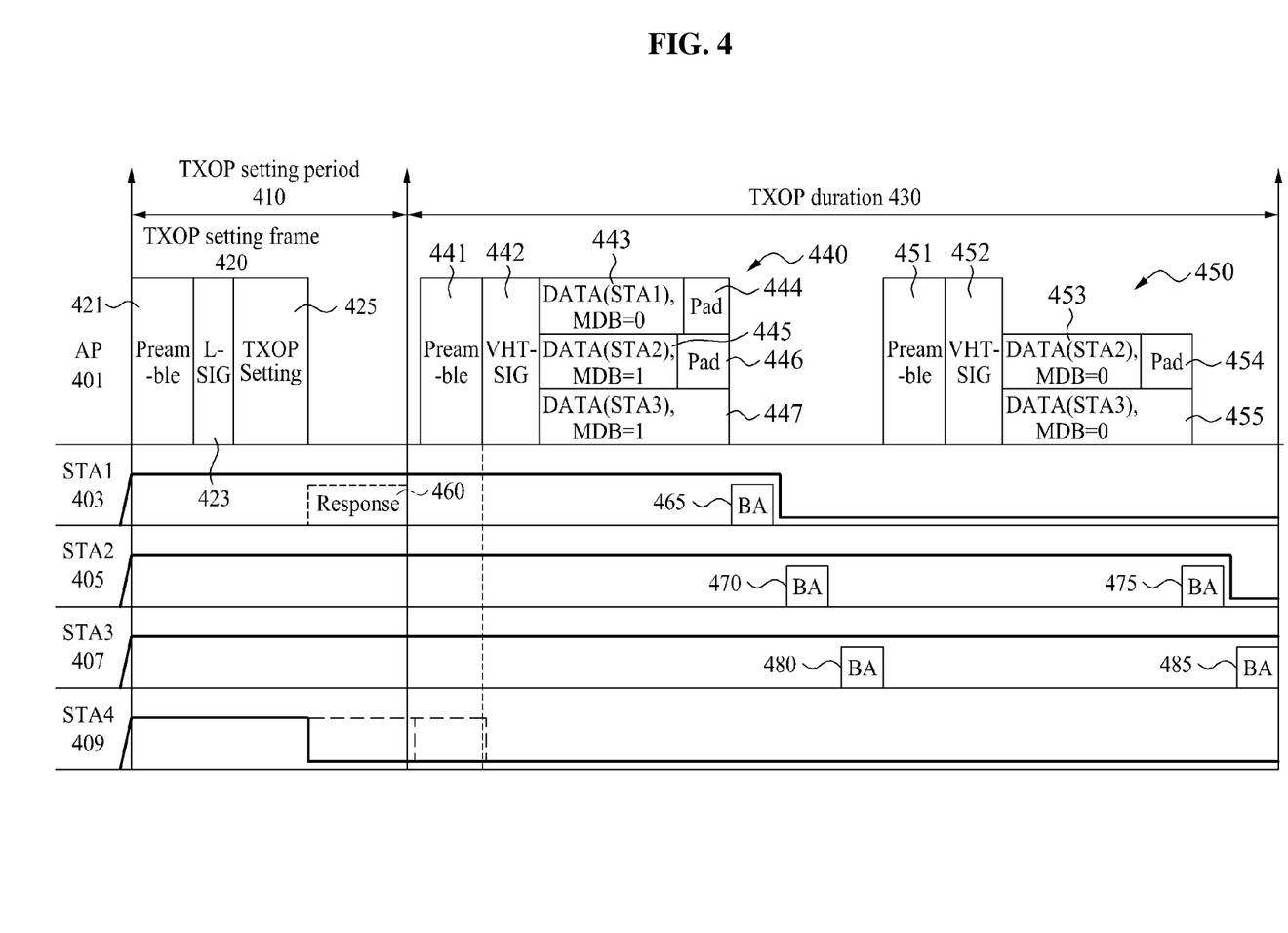
FIG. 4 is a diagram illustrating an example of a TXOP setting frame and a TXOP duration.

FIG. 4 illustrates an example of a TXOP setting frame and a TXOP duration. In FIG. 4, AP is used to indicate an access point and STA is used to indicate a terminal.

Referring to FIG. 4, AP 401 desiring to transmit data to at least one STA may be assigned the right to use a channel for a predetermined duration, for example, a TXOP duration 430 and may exclusively use the channel during the predetermined duration. In this example, an STA (1) 403, an STA (2) 405, an STA (3) 407, and an STA (4) 409 may transmit block ACKs (BAs) 465, 470, 475, 480, and 485 with respect to a received packet or frame for the TXOP duration 430.

For example, the AP 401 may transmit data to only a single STA or only an STA of a predetermined group for the TXOP duration 430.

If there is no additional data to be transmitted to the predetermined STA of the group during the remainder of the TXOP duration 430, the AP 401 may indicate, that there is no additional data to be transmitted using a frame or a packet currently transmitted. In this example, the AP 401 may not transmit data to the corresponding STA for the remainder of the TXOP duration 430.

To indicate whether there is additional data to be transmitted to the corresponding STA, the AP 401 may use a single bit of a MDB. The MDB may be included in a preamble of a packet to be transmitted or in a MAC header.

For example, if the MDB is set to '0' for a terminal, this may be used to indicate that the AP 401 has no more additional data to transmit to the terminal. Accordingly, the terminal may operate in a power saving mode, that is, in a sleep state during the remainder of the TXOP duration 430 after terminating receiving of a corresponding packet from the AP 401, or after transmitting a BA. In this example, if data to be transmitted to the terminal reoccurs after the AP 401 indicates that there is no additional data to be transmitted to the corresponding STA, the AP 401 may store the data in a buffer until a subsequent TXOP.

To enable a predetermined STA to occupy a channel for a predetermined period, another STA excluding an STA assigned with a right to access the channel in a cell or a basic service set (BSS) may avoid the channel access for a corresponding TXOP duration. The TXOP duration may be set such that all the STAs within the cell or the BSS may avoid the channel access for the corresponding TXOP duration.

Hereinafter, an example of a method of setting the TXOP duration 430 by setting a separate TXOP setting period 410 is described.

The AP 401 may set a time duration of a TXOP with respect to a channel, that is, the TXOP duration 430 by transmitting a TXOP setting frame 420 during the TXOP setting period 410.

The TXOP setting frame 420 may include information that is used to set the TXOP duration 430. The TXOP setting frame 420 may be transmitted in a form that may be overheard by all the STAs within a cell or a BSS, for example, STAs that have set a power management mode to a power saving mode and STAs that have not set the power management mode to the power saving mode.

For example, a multi-user precoding scheme and the like may not be applied to the TXOP setting frame 420. The TXOP setting frame 420 may be generated such that it is capable of being decoded by all of the STAs within the cell.

The TXOP setting frame 420 may include information about whether to apply the power saving mode, or a target reception group that is a transmission target of a frame during the TXOP duration 430. Information that is associated with the target reception group may include a predetermined group with the same group ID and information indicating STAs that are included in the predetermined group. An STA that is excluded from a corresponding reception group may maintain a sleep state during the TXOP duration 430 after receiving the TXOP setting frame 420.

An STA such as STA 1 403 that is included in the target reception group may transmit a response frame 460 with respect to the TXOP setting frame 420. For example, the response frame 460 may include a portion of or all of the fields included in the TXOP setting frame 420.

Accordingly, hidden nodes not receiving the TXOP setting frame 420 may set a TXOP. If a plurality of STAs transmit the response frame 460, the STAs may transmit the response frame 460 according to a predetermined order and a predetermined method. For example, the predetermined order and the predetermined method may be included in the TXOP setting frame 420.

Information that is associated with the predetermined group having the same group ID and the STAs that are included in the predetermined group may receive a frame that is transmitted for the TXOP duration 430, in addition to the TXOP setting frame 420, for example, frames 440 and 450. The TXOP setting period 410 may be used to set the time duration of the TXOP with respect to the channel, for example, the TXOP duration 430.

As an example, in the TXOP setting period 410 for setting the TXOP duration 430, the AP 401 may transmit the TXOP setting frame 420 to the STA (1) 403, the STA (2) 405, the STA (3) 407, and the STA (4) 409 within the cell.

The TXOP setting frame 420 may be used to indicate whether a corresponding STA is to receive a corresponding stream during the TXOP duration 430, or whether to operate in the power saving mode for the duration of the TXOP 430. In the example of FIG. 4, the STA (1) 403, the STA (2) 405, and the STA (3) 407 are to receive data from the AP 401 during the TXOP duration 430.

For example, the TXOP setting frame 420 may include a preamble 421, a legacy signal field (L-SIG) 423, and TXOP setting information 425 for setting the TXOP duration 430.

Each of the STA (1) 403, the STA (2) 405, the STA (3) 407, and the STA (4) 409 may set the time duration, for example, the TXOP duration 430 based on the TXOP setting information. In this example, the TXOP duration 430 is a timer period in which the AP 401 obtaining a TXOP with respect to a channel to simultaneously transmit data streams to one or more STAs from the group of the STA (1) 403, the STA (2) 405, the STA (3) 407, and the STA (4) 409.

In this example, each of the STA (1) 403, the STA (2) 405, and the STA (3) 407 are to receive data from the AP 401 during the TXOP duration 430. Accordingly, the STA (1) 403, the STA (2) 405, and the STA (3) 407 may operate in an active mode for the TXOP duration 430 and may receive a packet or a frame from the AP 401. However, the STA (4) 409 is not to receive data from the AP 401 during the TXOP duration 430. Accordingly, the STA (4) to 409 may not access a radio channel for the TXOP duration 430.

The TXOP setting information 425 may include information that is associated with a group of STAs to receive data from the AP 401 among the STA (1) 403, the STA (2) 405, the STA (3) 407, and the STA (4) 409. Each of the STA (1) 403, the STA (2) 405, the STA (3) 407, and the STA (4) 409 may set the TXOP duration 430 based on the TXOP setting information 425.

The STA (1) 403 is to receive data from the AP 401 and may transmit, to the AP 401, the response frame 460 with respect to the TXOP setting information 425. The response frame 460 may prevent entangling of the STA (1) 403, the STA (2) 405, the STA (3) 407, and the STA (4) 409, for example, when coverages of a plurality of APs overlap with each other.

If there is no additional data to be transmitted before the set TXOP duration 430 ends, the AP 401 having transmitted data within the TXOP duration 430 may terminate the TXOP duration 430 early. An example in which the AP 401 truncates the TXOP duration 430 is described with reference to FIG. 5.

In FIG. 4, it is assumed that the STA (1) 403, the STA (2) 405, and the STA (3) 407 correspond to STAs that are to receive data from the AP 401, and the STA (4) 409 corresponds to an STA that is not to receive data from the AP 401.

The AP 401 may transmit, to each of the STA (1) 403, the STA (2) 405, the STA (3) 407, the STA (4) 409, packets or frames including control information and data. The AP 401 may include information that is associated with the STAs that are to receive data, in control information of a data frame for the corresponding STAs and thereby transmit the data frame. Because the STA (4) 409 is not to receive data from the AP 401 during the TXOP duration 430, the STA (4) 409 may operate in the power saving mode for the TXOP duration 430.

For example, information that is associated with a reception group may be transmitted using a group ID through VHT-SIG fields 442 and 452 of frames 440 and 450 to that are transmitted during the TXOP duration 430. The reception group may indicate a group of STAs that have data to be transmitted from the AP 401 to the STAs.

In some examples, the STA (4) 409 may verify the VHT-SIG field 442 of the frame 440 in the TXOP duration 430 and then, verify that there is no data to be transmitted to the STA (4) 409 and immediately enter into a sleep state for the remainder of the TXOP duration 430. The STA (4)

409 entering into the sleep state may not overhear a frame or a packet to be transmitted to another STA. The STA (4) 409 may not perform an active receive operation for receiving a frame or a packet during the remainder of the TXOP duration 430 thereby minimizing power consumption.

The preambles 441 and 451 may be used for one or more of the STA (1) 403, the STA (2) 405, the STA (3) 407, and the STA (4) 409 to estimate a channel or to sense a frame or a packet. In this example, each of the VHT-SIG fields 442 and 452 may include a control signal with respect to the STA (1) 403, the STA (2) 405, and/or the STA (3) 407 which are to receive data at a very high throughput.

Examples of the control signal include information that is associated with a modulation scheme, a channel coding scheme, and the like, with respect to data included in each of data areas 443, 445, 447, 453, and 455 of the frames 440 and 450.

The frame 440 includes the data areas 443, 445, and 447 that are to be transmitted to STA (1) 403, the STA (2) 405, and the STA (3) 407, respectively. The frame 450 includes the data areas 453 and 455 that are to be transmitted to the STA (2) 405 and the STA (3) 407, respectively.

Prior to an end point in time of a packet, transmission of data included in each data area may be completed, and transmission with respect to a corresponding STA may be completed.

For example, in the first frame 440, the first data area 443 may be terminated when transmission of first data is completed, and the second data area 445 may be terminated when transmission of second data is completed. In the first frame 440, because transmission of third data is not completed by an end point in time of the packet, the third data area 447 may be terminated at the end point in time of the frame. In the example of the first frame 440, a pad 444 may be added to a rear of the data area 443, a pad 446 may be added to a rear of the data area 445.

Each of the data areas 443, 445, 447, 453, and 455 may additionally include a transmission complete message with respect to each data. An MDB may be used to indicate whether there is data to be additionally transmitted during the remainder of the TXOP with respect to the corresponding frame or the corresponding channel. In this example, the TXOP duration 430 may be used as the transmission complete message.

For example, transmission of first data is completed within the first frame 440 and there is no more data to be transmitted to the STA (1) 401 during the TXOP duration 430. In this example, the AP 401 may set an MDB with respect to the STA (1) 403 as '0'. The MDB with respect to the STA (1) 403 may be included in an end portion of the first data area 443 and may be transmitted to the STA (1) 403.

The STA (1) 403 may receive a packet with the MDB set to '0' and determine that there is no more data to be transmitted to the STA (1) 403 during the TXOP duration 430. Accordingly, the STA (1) 403 may operate in the power saving mode, for example, in the sleep state after transmission of the first data is completed, thereby reducing power consumption.

In this example, the AP 401 has additional data to transmit to the STA (2) 405. Accordingly, the MDB bit corresponding to the STA (2) 405 is set to indicate that the AP 401 has additional data to transmit to the STA (2) 405 during the TXOP duration 430. In this example, the '1' bit is used to indicate that there is additional data to be transmitted. However, this is merely for purposes of example, and any desired character may be used or symbol may be used.

In addition, although transmission of data transmitted to the STA (3) 407 is completed in the third data area 447 of the first packet 440, data to be transmitted to the STA (3) 407 remains. In this example, a remaining portion of the third data may be transmitted using the third data area 455 of the second frame 450. In this example, the AP 401 may set the MDB corresponding to the STA (3) 407 as '1'.

The STA (1) 403, the STA (2) 405, and the STA (3) 407 may receive a frame or a packet within the TXOP duration 430, and may transmit, to the AP 401, ACK messages or the BAs 465, 470, 475, 480, and 480.

The AP 401 may transmit data to STAs that are included in predetermined groups that have the same group ID or a separate STA for the TXOP duration 430.

If there is no more data to be transmitted to a predetermined STA within a predetermined group for the TXOP duration 430, the AP 401 may indicate, in a currently transmitting frame or packet, that there is no additional data to be transmitted to the predetermined STA and then, may not transmit data to the predetermined STA for the remainder of the TXOP duration 430.

As described in various example, the AP 401 may generate an indicator indicating that there is no more data to be transmitted to a predetermined STA for the TXOP duration 430. For this operation, the AP 401 may use a single bit of MDB. For example, if there is no more data to be transmitted to the STA (1) 403, the AP 401 may set the MDB of the STA (1) 403 to '0'. If there is data to be transmitted to the STA (2) 405, the AP 401 may set an MDB of the STA (2) 405 to '1'.

The MDB may be included in a preamble or a header of a MAC frame to be transmitted to each STA.

If the MDB is set to '0', a terminal may maintain the power saving mode by the end of the TXOP duration 430 after terminating receiving of a corresponding packet, or after transmitting an ACK or a BA with respect to the corresponding packet.

For those STAs that receive an indicator indicating that there is no more data to be transmitted during the TXOP duration, the AP 401 may not transmit data to a corresponding STA for the remainder of the TXOP duration 430. In this example, if data to be transmitted to the STA (1) 403 reoccurs after indicating that there is no data additional to be transmitted to the STA (1) 403, the AP 401 may buffer the corresponding data in a buffer until a subsequent TXOP. That is, if data to be transmitted to the STA (1) 403 occurs during the TXOP duration 430, the AP 401 may buffer the data to be transmitted by a subsequent time duration with respect to the STA (1) 403. In this example, 'until the subsequent channel is occupied' may indicate a subsequent time duration corresponding to another TXOP, and may indicate a TXOP duration that is subsequent to the TXOP duration 430.

Figure 5:
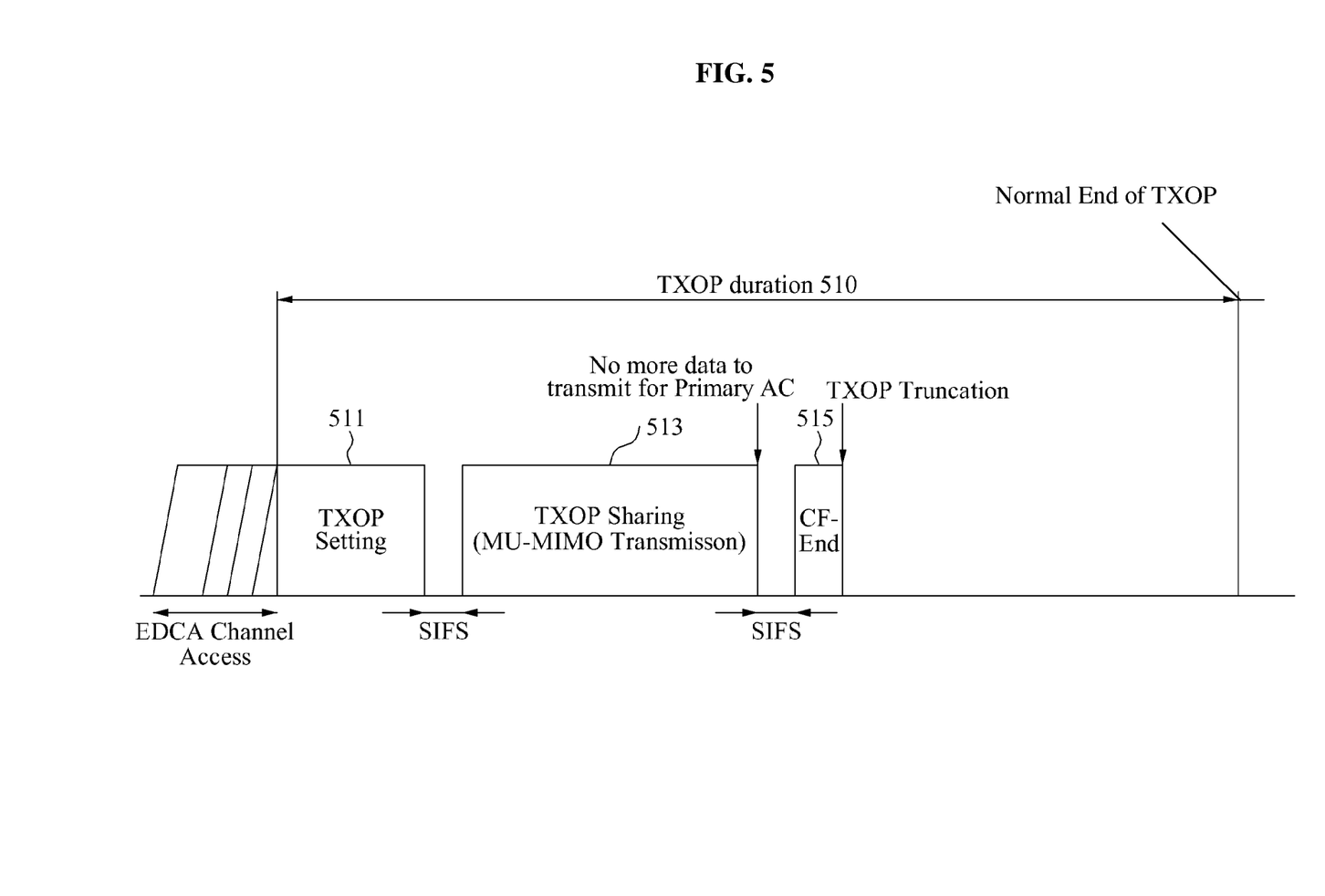
FIG. 5 is a diagram illustrating an example of truncation of a TXOP duration.

FIG. 5 illustrates an example of truncation of a TXOP duration.

As described above with reference to FIG. 4, an access point may transmit TXOP sharing, for example, an MU-MIMO data frame 513 to a terminal based on a TXOP setting frame 511. If there is no more data to be transmitted to the terminal prior to an initially set TXOP duration 510 ending, the access point may transmit, to the terminal, a frame indicating an end of the TXOP duration 510 and may truncate the TXOP duration 510. The frame indicating the end of the TXOP duration 510 may be, for example, a contention free-end (CF-End) frame 515.

If the TXOP duration 510 is truncated, a problem may occur due to terminals in a sleep state for the existing set TXOP duration 510. The terminals in the sleep state may not receive the frame indicating the end of the TXOP duration 510 and thus, may be unaware that the TXOP duration 510 is truncated. Accordingly, the terminals in the sleep state may remain in the sleep state until the end of the TXOP duration 510.

In this circumstance, if the access point or terminals in an active mode were to transmit data to the terminals in the sleep state, communication may not be properly performed, thereby deteriorating throughput of the whole network.

As described in various examples, terminals may save power for a TXOP duration by setting a corresponding mode so that an access point may become aware of a current state of the terminals desiring to save power. Even though the TXOP duration is truncated, the access point may assume that a terminal in a power saving mode remains in a sleep state for the end of the initially set TXOP duration and thereby may not transmit data to the corresponding terminal.

To inform the access point about whether the terminal supports the power saving mode, the terminal may use a power saving mode indicator. For example, as described herein with reference to FIG. 1, the power saving mode indicator may be expressed using a separate bit indicating the non-TXOP power saving mode 130 and the TXOP power saving mode 140.

Figure 6:
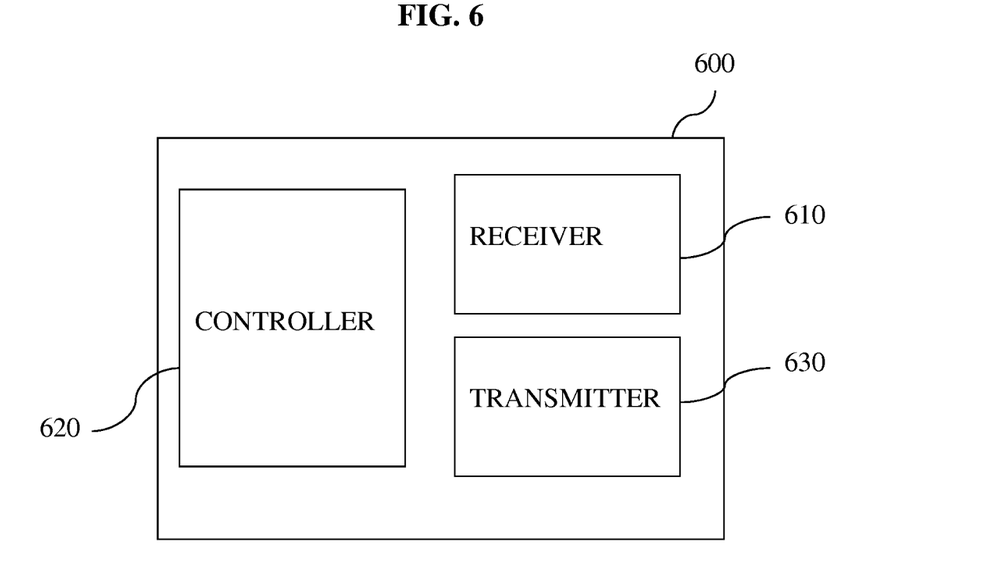
FIG. 6 is a diagram illustrating an example of a terminal.

FIG. 6 illustrates an example of a terminal.

Referring to FIG. 6, terminal 600 is capable of operating in an active power saving mode. The terminal includes a receiver 610, a controller 620, and a transmitter 630.

The receiver 610 may receive a data stream from an access point (AP). A data frame included in the data stream may include a group ID indicating whether the terminal is included in a group that is served by the AP.

As another example, the data frame may include an indicator that indicates whether the terminal is included in a group that is to receive data from the AP during a transmission opportunity (TXOP) obtained by the AP. For example, the indicator may be a number of state time space (NsTs) included in a very high throughput signal (VHT-SIG) field of the data frame.

As another example, the data frame may include a more data bit (MDB) indicating whether transmission of data to the terminal is completed for the remainder of the TXOP duration. For example, the MDB may be included in a media access control (MAC) header of the data frame.

The controller 620 may control a power saving mode of the terminal 600 based on the information included in the data frame.

For example, in response to the data frame including an indicator indicating that the terminal 600 is included in the group served by the AP, and a NsTs field indicating that the terminal is to receive data during a TXOP obtained by the AP, the controller may operate the terminal 600 in an active state in which the terminal listens for a next data frame.

As another example, in response to the frame including an indicator indicating that the terminal 600 is included in the group served by the AP, and the frame including a NSTS field indicating that the terminal is to receive data during a TXOP obtained by the AP, and including a MDB indicating that the terminal 600 is not to receive additional data during the remainder of the TXOP obtained by the AP, the controller may operate the terminal 600 in sleep state in which the terminal 600 does not listen for a next data frame, after the terminal 600 is finished receiving the data included in the frame.

The transmitter 630 may transmit, to the AP, a frame comprising a power saving mode indicator that indicates whether the terminal is capable of operating in the power saving mode for a TXOP duration. For example, the power save mode indicator may be included in a capability/support field of an association request frame described by 802.11

As another example, the receiver 610 may receive, from the AP, a beacon frame comprising an information element or a capability element that indicates whether the AP is capable of supporting power saving mode for a TXOP duration.

In various examples, an access point may transmit at least one frame to a terminal without additional contention after occupying a channel for a TXOP duration. Therefore, it is possible to enhance transmission efficiency and quality of service (QoS).

In various examples, even though a TXOP duration is truncated before the initially set TXOP duration ends, it is possible to prevent the efficiency of whole network from decreasing by transmitting data to a terminal that does not operate in a power saving mode and that does not enter into a sleep state.

In various examples, if there is no stream of data to be transmitted to a terminal operating in a power saving mode during a TXOP duration, the terminal may recognize that there is no data stream before an end of the TXOP duration, and may maintain an operation state of the terminal in a sleep state for the duration of the TXOP, thereby reducing power.

In various examples, if a predetermined criterion is satisfied, a terminal operating in a power saving mode may change an operation state of the terminal from an awake state to a sleep state, thereby reducing power consumption.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a terminal, comprising:
   receiving, from a access point, information indicating whether the access point supports a power saving mode for a transmission opportunity (TXOP) duration, the power saving mode indicating whether an operation state of the terminal is changeable during the TXOP duration; and
   transmitting, to the access point, an association request frame, that includes power saving mode information that indicates whether the terminal enables the power saving mode for the TXOP duration.

2. The method of claim 1, wherein the power saving mode controls an operation state of the terminal to enter a sleep state from an awake state during the TXOP duration in response to a criterion being satisfied.

3. The method of claim 2, further comprising:
   based on at least one of the information received from the access point and the information transmitted to the access point, remaining in the awake state during the TXOP duration or transitioning to the sleep state during the TXOP duration.

4. The method of claim 1, further comprising:
   receiving, from the access point, a data frame comprising a very high throughput signal (VHT-SIG) field and a medium access control (MAC) header.

5. The method of claim 4, wherein the VHT-SIG field comprises a group identifier (ID).

6. The method of claim 4, wherein the VHT-SIG field comprises information indicating a number of streams intended for the terminal.

7. The method of claim 4, wherein the MAC header comprises information indicating additional data to be transmitted to the terminal.

8. The method of claim 1, wherein the transmitting to the access point comprising the transmitting power saving mode information while the terminal is performing association with the access point.

9. The method of claim 8, wherein:
   the power saving mode information has a first logic value in response to the terminal supporting the power saving mode, and
   the power saving mode information has a second logic value in response to the terminal not supporting the power saving mode.

10. The method of claim 1, further comprising:
    transmitting, to the access point, information indicating the operation state of the terminal.

11. The method of claim 1, further comprising:
    changing an operation state of the terminal, based on information received from the access point.

12. The method of claim 11, wherein the changing comprises changing the operation state of the terminal to one of an awake state and a sleep state, based on the information received from the access point.

13. The method of claim 12, wherein the information received from the access point comprises at least one of: a group identifier (ID) of a group comprising the terminal, information indicating whether a data stream corresponding to the terminal is transmitted from the access point during the TXOP duration, and information indicating whether there is an additional data stream to be transmitted to the terminal during a remainder of the TXOP duration.

14. The method of claim 11, wherein:
    the power saving mode information is disposed in a capability field or support field of the association request frame.

15. A terminal comprising:
    a transmitter configured to transmit, to an access point, an association request frame, that includes power saving mode information that indicates whether the terminal enables a power saving mode for a transmission opportunity (TXOP) duration, the power saving mode indicating whether an operation state of the terminal is changeable during the TXOP duration; and
    a receiver configured to receive, from the access point, information indicating whether the access point supports the power saving mode for the TXOP duration.

16. The terminal of claim 15, wherein the power saving mode controls an operation state of the terminal to enter a sleep state from an awake state during the TXOP duration in response to a criterion being satisfied.

17. The terminal of claim 16, wherein the terminal remains in the awake state during the TXOP duration or transitions to the sleep state during the TXOP duration, based on at least one of the information received from the access point and the information transmitted to the access point.

18. The terminal of claim 15, wherein the receiver is further configured to receive, from the access point, a data frame comprising a very high throughput signal (VHT-SIG) field and a medium access control (MAC) header.

19. The terminal of claim 18, wherein the VHT-SIG field comprises a group identifier (ID).

20. The terminal of claim 18, wherein the VHT-SIG field comprises information indicating a number of streams intended for the terminal.

21. The terminal of claim 18, wherein the MAC header comprises information indicating additional data to be transmitted to the terminal.

22. The terminal of claim 15, wherein the transmitter is further configured to transmit the power saving mode information while the terminal is performing association with the access point.

23. The terminal of claim 22, wherein:
the power saving mode information has a first logic value in response to the terminal supporting the power saving mode, and
the power saving mode information has a second logic value in response to the terminal not supporting the power saving mode.

24. The terminal of claim 15, wherein the transmitter is further configured to transmit, to the access point, information indicating the operation state of the terminal.

25. The terminal of claim 15, wherein an operation state of the terminal is changed, based on information received from the access point.

26. The terminal of claim 25, wherein the operation state of the terminal is changed to one of an awake state and a sleep state, based on the information received from the access point.

27. The terminal of claim 26, wherein the information received from the access point comprises at least one of: a group identifier (ID) of a group comprising the terminal, information indicating whether a data stream corresponding to the terminal is transmitted from the access point during the TXOP duration, and information indicating whether there is an additional data stream to be transmitted to the terminal during a remainder of the TXOP duration.

28. The terminal of claim 15, wherein:
the power saving mode information comprises a power saving mode indicator.

29. The terminal of claim 15, wherein:
the power saving mode information is disposed in a capability field or support field of the association request frame.

30. A communication method of a terminal, comprising:
receiving, from an access point, information indicating whether the access point supports a power saving mode for a transmission opportunity (TXOP) duration; and
transmitting, to the access point, an association request frame, that includes power saving mode information that indicates whether the terminal enables the power saving mode for the TXOP duration, the power saving mode indicating whether an operation state of the terminal is changeable during the TXOP duration.

31. The method of claim 30, further comprising:
receiving, from the access point, a data frame comprising a very high throughput signal (VHT-SIG) field and a medium access control (MAC) header.

32. The method of claim 31, wherein the VHT-SIG field comprises a group identifier (ID).

33. The method of claim 31, wherein the VHT-SIG field comprises information indicating a number of streams intended for the terminal.

34. The method of claim 31, wherein the MAC header comprises information indicating additional data to be transmitted to the terminal.

35. The method of claim 30, wherein the transmitting to the access point comprising the transmitting power saving mode information while the terminal is performing association with the access point.

* * * * *